United States Patent
Kesler

(10) Patent No.: US 10,891,118 B2
(45) Date of Patent: Jan. 12, 2021

(54) OBJECT GRAPH TRAVERSAL AND PROCESSING

(71) Applicant: INTUIT INC., Mountain View, CA (US)

(72) Inventor: Grigoriy Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/591,396

(22) Filed: Oct. 2, 2019

(65) Prior Publication Data
US 2020/0050438 A1   Feb. 13, 2020

Related U.S. Application Data

(63) Continuation of application No. 15/418,225, filed on Jan. 27, 2017, now abandoned.

(51) Int. Cl.
*G06F 8/41* (2018.01)
*G06F 8/30* (2018.01)
*G06F 16/901* (2019.01)

(52) U.S. Cl.
CPC ............ *G06F 8/4434* (2013.01); *G06F 8/315* (2013.01); *G06F 16/9024* (2019.01)

(58) Field of Classification Search
CPC ..... G06F 8/4434; G06F 16/9024; G06F 8/315
See application file for complete search history.

(56) References Cited

U.S. PATENT DOCUMENTS

| | | | |
|---|---|---|---|
| 5,864,819 A * | 1/1999 | De Armas | G06F 3/16 704/275 |
| 6,314,436 B1 * | 11/2001 | Houldsworth | G06F 12/0253 |
| 6,363,403 B1 * | 3/2002 | Roy | G06F 12/0261 |
| 6,604,105 B1 * | 8/2003 | Roth | G06F 16/9024 |
| 8,194,075 B2 * | 6/2012 | Breeds | G06F 3/0482 345/440 |
| 8,260,793 B2 * | 9/2012 | Kiraly | G06F 16/2458 707/756 |
| 9,465,723 B2 * | 10/2016 | Sunderland Schanck | G06F 11/3664 |
| 9,600,411 B2 * | 3/2017 | Foti | G06F 12/0253 |
| 9,971,632 B2 * | 5/2018 | O'Meara | G06F 9/5016 |
| 10,031,843 B2 * | 7/2018 | Slattery | G06F 12/0269 |
| 10,037,269 B2 * | 7/2018 | Slattery | G06F 12/0269 |

(Continued)

OTHER PUBLICATIONS

Detlefs, David, et al. "Garbage-first garbage collection." Proceedings of the 4th international symposium on Memory management. 2004. (Year: 2004).*

(Continued)

*Primary Examiner* — Matthew J Brophy
(74) *Attorney, Agent, or Firm* — Patterson + Sheridan, LLP

(57) ABSTRACT

The present disclosure relates to traversing and processing objects in an object graph. The method and system evaluate an object in the graph to identify one or more objects referenced by the first object. The second object is evaluated to determine whether it is present in a list or previously visited objects, and when it is not, the second object is added to a container of objects and the second object is added to the list of previously visited objects. The first object is processed and then the next object in the container is evaluated.

20 Claims, 6 Drawing Sheets

(56) References Cited

U.S. PATENT DOCUMENTS

| | | | |
|---|---|---|---|
| 2005/0086656 A1* | 4/2005 | Whitlock | G06F 9/52 718/1 |
| 2005/0108627 A1* | 5/2005 | Mireku | G06F 40/197 715/234 |
| 2007/0016608 A1* | 1/2007 | Mullins | G06F 16/289 |
| 2007/0192080 A1* | 8/2007 | Carpenter | G06F 11/3672 703/22 |
| 2009/0327372 A1* | 12/2009 | Ylonen | G06F 12/0253 |
| 2010/0083172 A1* | 4/2010 | Breeds | G06F 3/0482 715/810 |
| 2010/0211753 A1* | 8/2010 | Ylonen | G06F 12/0253 711/165 |
| 2010/0223433 A1* | 9/2010 | Ylonen | G06F 12/0253 711/154 |
| 2010/0228796 A1* | 9/2010 | Goetz | G06F 12/0253 707/814 |
| 2011/0035405 A1* | 2/2011 | Kiraly | G06F 16/2458 707/769 |
| 2012/0197944 A1* | 8/2012 | Foti | G06F 12/0253 707/798 |
| 2013/0311730 A1* | 11/2013 | Slattery | G06F 12/0269 711/156 |
| 2016/0117237 A1* | 4/2016 | Sunderland Schanck | G06F 11/362 717/125 |
| 2016/0140036 A1* | 5/2016 | O'Meara | G06F 9/5022 711/166 |
| 2016/0306896 A1* | 10/2016 | Paradies | G06F 16/9024 |
| 2016/0328318 A1* | 11/2016 | Slattery | G06F 12/0269 |
| 2016/0328319 A1* | 11/2016 | Slattery | G06F 12/023 |

OTHER PUBLICATIONS

Kafura, Dennis, Manibrata Mukherji, and Douglas M. Washabaugh. "Concurrent and distributed garbage collection of active objects." IEEE Transactions on Parallel and Distributed Systems 6.4 (1995): 337-350. (Year: 1995).*

Huelsbergen, Lorenz, and Phil Winterbottom. "Very concurrent mark-&-sweep garbage collection without fine-grain synchronization." ACM SIGPLAN Notices 34.3 (1998): 166-175. (Year: 1998).*

* cited by examiner

FIG. 3A

| Traversal Operation Step | 1 | 2 | 3 | 4 | 5 | 6 | 7 |
|---|---|---|---|---|---|---|---|
| Current Object | 1 | 4 | 7 | 6 | 3 | 2 | 5 |
| Stack | 4<br>3<br>2 | 7<br>3<br>2 | 6<br>3<br>2 | 3<br>2 | 2 | 5 | |

FIG. 3B

| Traversal Operation Step | 1 | 2 | 3 | 4 | 5 | 6 | 7 |
|---|---|---|---|---|---|---|---|
| Current Object | 1 | 2 | 3 | 4 | 5 | 6 | 7 |
| Queue | | 4<br>3<br>2 | 6<br>5<br>4<br>3 | 7<br>6<br>5<br>4 | 7<br>6<br>5 | 7<br>6 | 7 | |

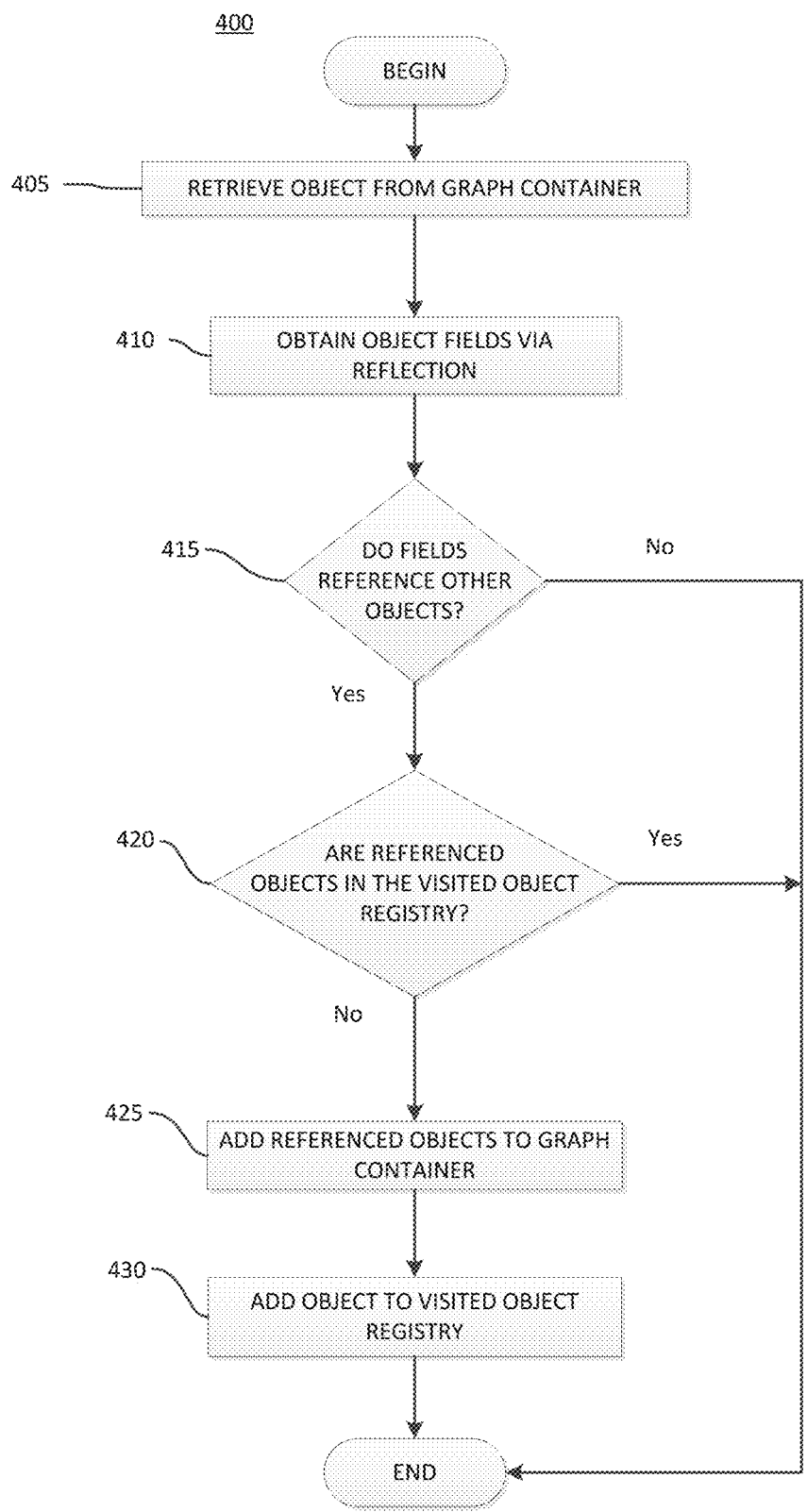

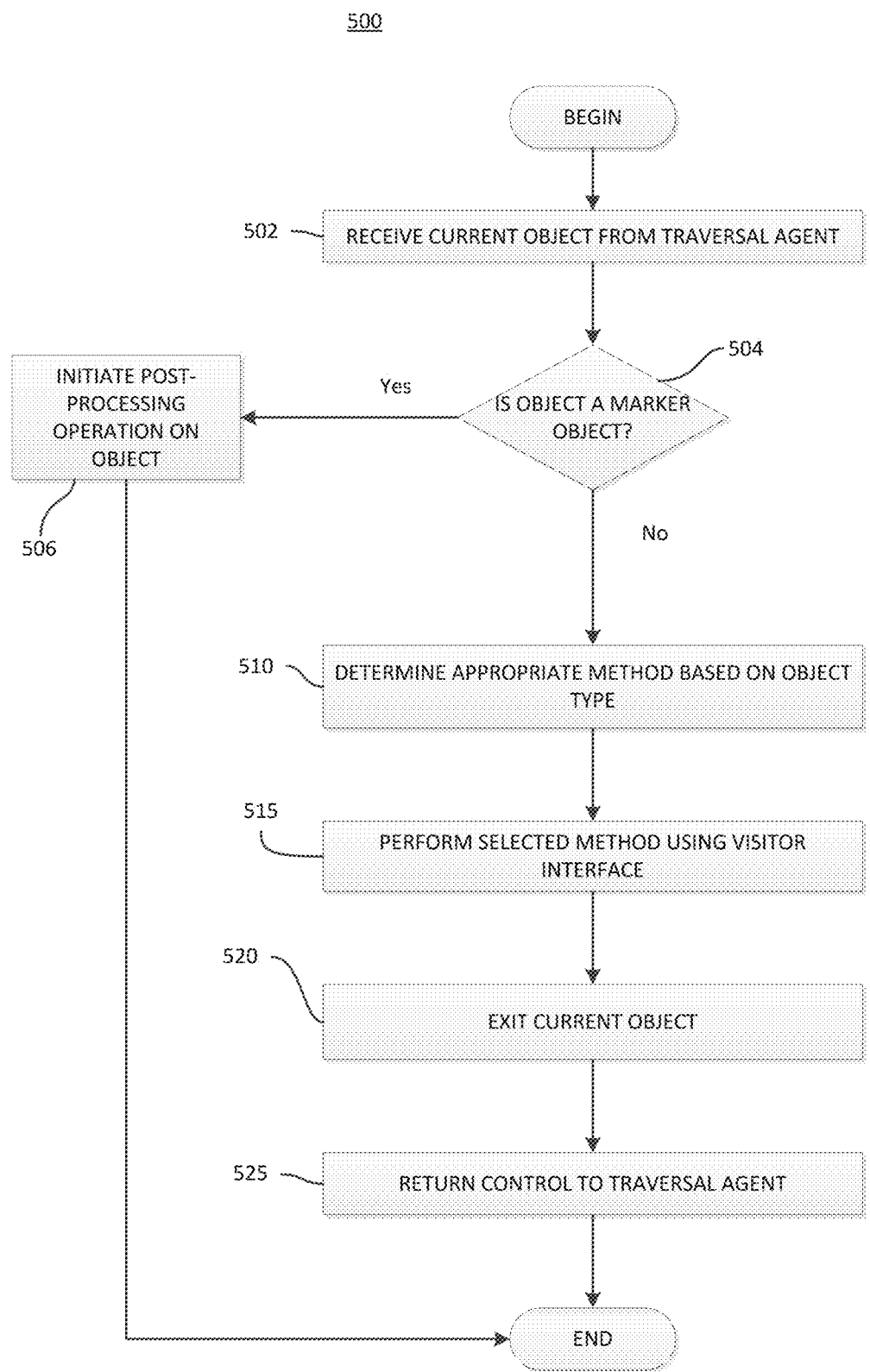

OBJECT GRAPH TRAVERSAL AND PROCESSING

CROSS-REFERENCE TO RELATED APPLICATIONS

This application is a continuation of U.S. patent application Ser. No. 15/418,225, filed Jan. 27, 2017, which is herein incorporated by reference.

BACKGROUND

Field

Embodiments presented herein generally relate to navigating through objects in an object oriented programming architecture, and more specifically by traversing and processing an object graph of a program using a registry of visited objects and a working queue of unvisited objects.

Description of the Related Art

In object oriented programming architectures it is often necessary for a program to traverse a graph of objects maintained by a program. Objects frequently cross reference other objects and any given object can be referenced by many others. For large systems, the graph of such references among objects can become very large and complex and include numerous cyclical references between objects that are difficult to identify prior to traversing the graph.

One approach to traversing a graph of objects is to use a recursive method. Recursively traversing the graph, however, is slow because this approach uses a call stack that contains a frame for a large number of objects in the graph. Moreover, this approach is fragile because cyclic references in graph objects can cause memory errors. The need to perform large numbers of frame swaps for the call stack results in a slow traversal when using recursion. Call stack recursion is a technique that typically performs a depth-first graph traversal, and when possible, a breadth-first traversal using recursion suffers a further performance degradation. Another limitation of recursive traversal is the lack of external control of the graph traversal, i.e., the traversal cannot easily be paused once started. These limitations can constrain the design of software systems.

SUMMARY

One embodiment of the present disclosure includes a method for traversing a graph of objects. The method evaluates a first object to identify a second object referenced by the first object. The method determines if the second object is present in an object registry, and when the second object is not present in the object registry, the method adds the second object to an object container, adds the second object to the object registry, and performs an action using the first object.

Another embodiment provides a computer-readable storage medium having instructions, which, when executed on a processor, operates to traverse a graph of objects. The processor evaluates a first object to identify a second object referenced by the first object. The processor determines if the second object is present in an object registry, and when the second object is not present in the object registry, the method adds the second object to an object container, adds the second object to the object registry, and performs an action using the first object.

Still another embodiment of the present invention includes a processor and a memory storing a program, which, when executed on the processor, performs an operation for traverse a graph of objects. The processor evaluates a first object to identify a second object referenced by the first object. The processor determines if the second object is present in an object registry, and when the second object is not present in the object registry, the method adds the second object to an object container, adds the second object to the object registry, and performs an action using the first object.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3A is a table illustrating an example traversal of an object graph, according to one embodiment.

FIG. 3B is a table illustrating an example traversal of an object graph, according to another embodiment.

FIG. 4 is a flow chart illustrating an example process for traversing an example object graph, according to an embodiment.

FIG. 5 is flow chart illustrating an example process for processing objects in the example object graph, according to one embodiment.

DETAILED DESCRIPTION

Figure 1:
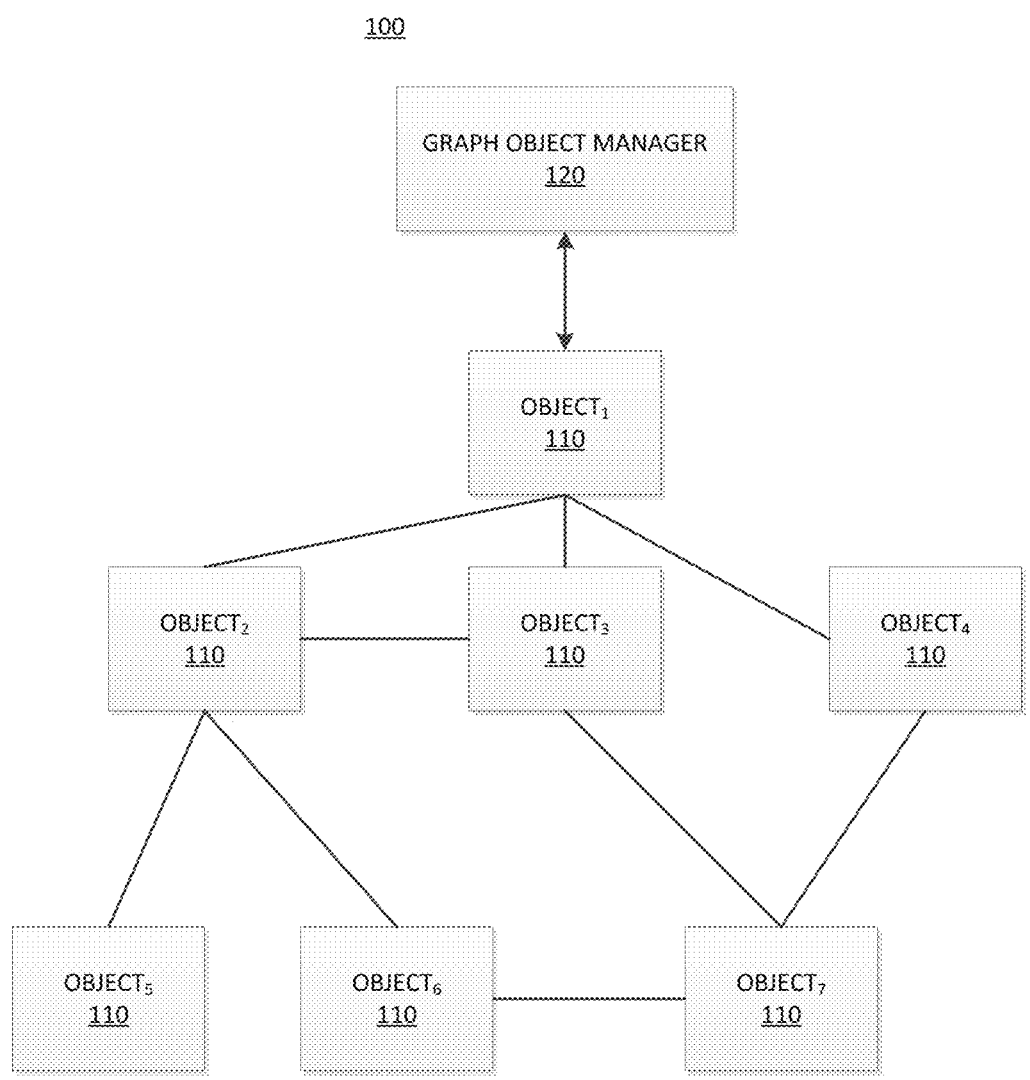
FIG. 1 illustrates an example object graph, according to one embodiment.

Traversing object graphs is a common operation in object oriented programs to find, filter and process objects. Although an object graph can be traversed using recursion, recursive processing is vulnerable to memory errors if the graph contains objects with cyclic references. Recursive traversal is also a relatively slow process because it relies on a call stack and does not allow for external control over the traversal process, i.e., once started, the traversal proceeds to completion without the user control.

Embodiments presented here provide techniques for traversing and processing object graphs in a software program executing on a computer system. That is, approaches presented herein use a stack or queue to maintain a path of the graph traversal while tracking visited objects. Doing so avoids memory errors that might otherwise be generated by cyclic references in an object graph being traversed and utilizes the computer system memory rather than the more limited thread memory. An iterator provides external control of the traversal process. Objects are processed using methods implemented with the visitor pattern, which provides flexibility to quickly add more processing options without the need to perform additional testing.

In one embodiment, traversal operation of the software program begins by determining if the starting object of the object graph contains references to other objects, such as in is a map or a list. For example, the traversal operation may use reflection to obtain information about an object, such as data field properties, to determine if the object contains a map or list. If the object contains a reference to another object, the operation determines whether the object has already been visited, and adds those objects that have not been visited to the working queue. The working queue, is merely one example of an object container to hold a set of objects the traversal operation has discovered but not yet visited. The working queue can alternatively be a stack or other comparable data structure. The traversal operation uses a visited object registry to track objects that have already been visited by the operation, which prevents the infinite looping that would otherwise occur with cyclic object references. Objects are added to the visited object registry when they are added to the stack. The object is processed after each of the referenced objects has been evaluated, i.e., unvisited objects have been added to the working queue and the visited object registry. The program executes the processing operation on the object after the referenced objects are added to the working queue and visited object registry. After the processing is complete, the program returns to the traversal operation to remove the next object from the working queue as to be evaluated as a "current object." Thus, the program evaluates the current object by determining whether the current object references other objects, populates working queue and visited object registry with newly encountered objects, and processes the current object. When the traversal operation encounters a terminal object, i.e., one that does not contain references to any other objects or only references objects previously visited, no additional objects are added to the working queue, and the terminal object is processed. Maintaining a working queue of objects for traversal can accommodate larger object graphs than recursive methods because the stack is not limited to thread memory. In embodiments using a queue, the program can initiate post-processing operations on objects that are maps or lists after the object processing is complete using a marker object. The marker object refers to the parent object and is inserted into the queue after all of the sub-objects in the map or list. When the marker object is removed from the queue, the program extracts the object following the marker object from the working queue and initiates external post-processing actions for the object referenced by the marker object. The marker object indicates that each of the sub-objects has been processed.

The program processes objects by operating on the data in the objects to perform a user selected operation, such as copying the object. The program accesses the data in the object using the visitor design pattern. In one embodiment, the software program processes objects using the visitor pattern, i.e., by calling an "enter object/visit object" method to start processing and calling a "leave object" method when the processing is complete. The visitor pattern allows functionality to be added by the clients implementing visitor methods on the visitor interface.

FIG. 1 illustrates an example computing environment, according to one embodiment. As shown, environment 100 includes an object graph with a plurality of objects 110. The objects 110 are generally interconnected though references and can contain cyclical references, such as between Object$_2$, Object$_3$, and Object$_4$. Environment 100 includes a graph object manager 120 that executes the program to traverse the graph and process the objects 110. In an embodiment, each object 110 represents an object stored by the system 100, and graph object manager 120 performs operations selected by a user on the graph objects. Graph object manager 120 processes objects 110 one at a time and uses the references in the object being evaluated, i.e., the current object, to traverse the graph. Graph object manager 120 processes objects according to the operation selected by a user, such as, for example, by comparing the object to another object, computing a hash code for the object, or transmitting the object via a stream.

Figure 2:
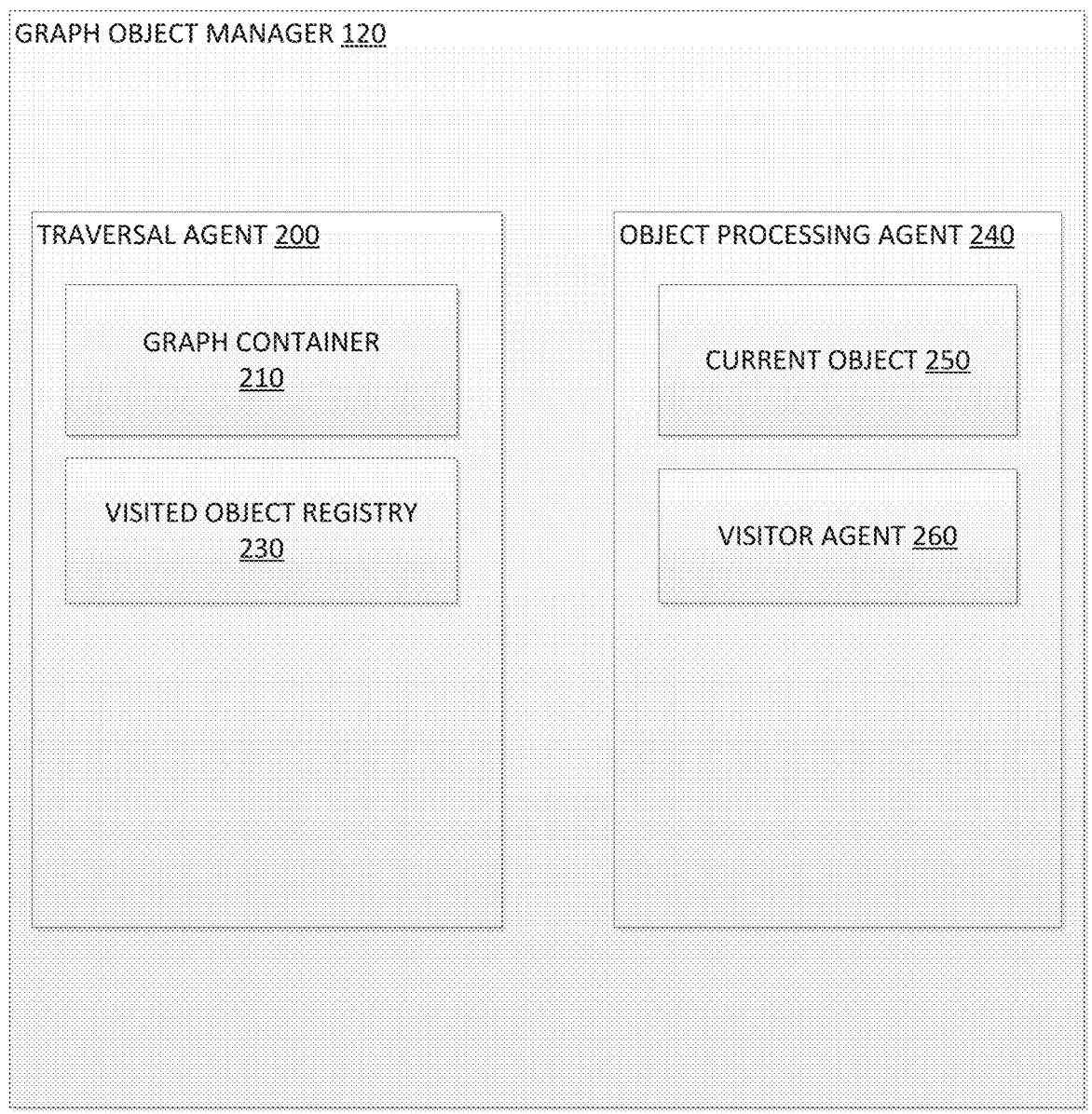
FIG. 2 is a block diagram illustrates an example graph object manager, according to one embodiment.

FIG. 2 illustrates an example graph object manager, according to one embodiment. As shown, graph object manager 120 includes a traversal agent 200 with a graph container 210 and a visited object registry 230. Graph object manager 120 also includes an object processing agent 240 that includes a current object 250 and visitor agent 260. To perform the processing operation selected by the user, the graph object manager 120 needs to visit objects in the graph and avoid visiting objects multiple times. Graph object manager 120 uses traversal agent 200 to perform the traversal operation.

Traversal agent 200 determines the order in which the objects in the graph are processed. Traversal agent 200 evaluates an object, i.e., the current object, to discover other objects referenced by the current object, if any. The traversal agent 200 adds unvisited objects to the graph container 210 and the visited object registry 230, and passes the current object to object processing agent 240 to perform the processing action on the objects in the graph.

Traversal agent 200 discovers objects in the graph by determining whether the current object includes references to other objects. When traversal agent 200 discovers an object referenced by the current object, traversal agent 200 determines whether the object has already been encountered during the traversal operation using the visited object registry 230. Visited object registry 230 includes objects that the traversal agent 200 has previously encountered during the traversal. When traversal agent 200 discovers an object that is not present in the visited object registry 230, traversal agent 200 adds the object to graph container 210 and the visited object registry 230. Traversal agent 200 prevents an infinite loop and memory overflow resulting from cyclical references by comparing the objects referenced in the current object to the objects in the visited object registry 230 and adding only objects that do not appear in the visited object registry 230 to the graph container 210.

Traversal agent 200 determines whether the current object references other objects, such as in a map or list, using, by way of example, the reflection property in the java programming language. Java reflection allows a program to access information about program objects. For example, Java reflection allows traversal agent 200 to retrieve information about the properties of an object, such as the methods and data fields of an object. Thus, traversal agent 200 can use java reflection to determine whether the object being evaluated includes references to other objects. When the object includes references to another object, traversal agent 200 obtains the object identifier of the referenced object and queries the visited object registry 230 to determine whether the object has already been visited. If the object is not present in the visited object registry, then traversal agent 200 adds the object to graph container 210. Each object referenced by the current object is evaluated in this manner and, when not previously visited, is added to the graph container 210. When traversal agent 200 adds an object to graph container 210, it also adds the object to visited object registry 230.

Traversal agent 200 can execute a breadth-first search or a depth-first search of the object graph. Traversal agent 200 can perform a breadth-first search, for example, when the processing operation can be completed by processing an object in the graph that is close to the starting object or processing can be completed without visiting every object in the object graph. Traversal agent 200 can perform a depth-first traversal, for example, when the processing operation needs to reach an object deep in the graph. Graph container 210 is a stack when traversal agent 200 performs a depth-first traversal, and graph container 210 is a queue when traversal agent 200 performs a breadth-first traversal.

FIGS. 3A and 3B illustrate a breadth-first traversal and a depth-first traversal of an object graph, according to an embodiment. FIGS. 3A and 3B are tables listing step-by-step traversal of the graph shown in FIG. 1, with FIG. 3A illustrating a depth-first traversal using a stack as the graph container 210 and FIG. 3B illustrating a breadth-first traversal using a queue as the graph container 210. FIGS. 3A and 3B show traversal operation steps 1-7 as individual columns listing the current object number for each step and the contents of the graph container 210 at each step. In FIG. 3A, the graph container 210 is shown as a stack with the object listed at the top being added most recently and being the next to be removed. For example, graph container for step 1 includes $Object_2$, $Object_3$, and $Object_4$, with $Object_4$ being at the top of the stack. In FIG. 3B, the graph contain 210 is shown as a queue with the object listed at the top being added most recently and the object at the bottom being the next to be removed.

As shown in FIG. 3A, beginning with $Object_1$ as the current object, traversal agent 200 determines if each of the objects referenced by $Object_1$, i.e., $Object_2$, $Object_3$, and $Object_4$, have already been encountered during the traversal by determining whether each object is present in the visited object registry. Traversal agent 200 adds $Object_2$, $Object_3$, and $Object_4$ to both the graph container and the visited object registry because these objects have not been encountered before. Traversal agent 200 provides $Object_1$ as the current object to object processing agent 240, which performs a user selected processing operation. Once the processing operation is complete, traversal agent 200 begins traversal operation step 2 by removing the object at the top of the graph container stack to use as the current object of step 2. As shown, $Object_4$ becomes the current object for step 2, and traversal agent 200 evaluates $Object_4$'s references using the visited object registry. Traversal agent 200 adds $Object_7$, referenced by $Object_4$, to the visited object registry and to the graph container because Objects was not present in the visited object registry when step 2 began. Next, object processing agent 240 performs the processing operation on $Object_4$ before returning control to traversal agent 200. Traversal agent 200 continues the steps of evaluating an object from the top of the stack, populating the graph container and visited object registry with newly encountered objects, and passing the current object to the object processing agent until all objects have been processed. The order in which the traversal agent 200 evaluates the objects in the graph is shown in the current object row proceeding from left to right. In this example, the operation proceeds depth-first from starting $Object_1$, to $Object_4$ in the second level of the graph, i.e., one step from $Object_1$, to $Object_7$ and then $Object_6$, each one additional step from $Object_1$.

FIG. 3B illustrates a breadth-first traversal of the object graph in FIG. 1, according to an embodiment. In FIG. 3B, the graph container 210 is shown as a queue where the object listed at the top of the object container is the most recent object added and the object at the bottom is the oldest object in the queue. In this embodiment, traversal agent 200 removes objects from the bottom of the queue when the traversal operation requires a new current object. Traversal agent 200 applies the same steps as in the depth-first traversal, i.e., evaluating the current object to obtain object references, for each object not present in the visited object registry, adding the object to the graph container queue and the visited object registry, and passing the current object to the object processing agent. In this embodiment, however, the order in which the objects are evaluated as the current object is different. As shown in FIG. 3B, the traversal agent 200 evaluates all of the objects at the same distance from the starting object, before moving to the next level of the graph. For example, $Object_1$ is the starting object in the graph, and $Object_2$, $Object_3$, and $Object_4$ form the second level, which is one step from starting $Object_1$. As shown in the current object row, the traversal operation first processes $Object_1$, then the operation processes all of the second level objects, i.e., $Object_2$, $Object_3$, and $Object_4$, in traversal operation steps 2, 3, and 4, respectively. After all the second level objects have been processed, the traversal operation moves to the objects an additional step from $Object_1$, i.e. $Object_5$, $Object_6$, and $Object_7$, that are two steps from $Object_1$.

In an embodiment, traversal agent 200 determines when post-processing operations can be applied to an object by tracking when processing of the referenced sub-objects of an object has been completed. When the graph container 210 is a queue, traversal agent 200 inserts a marker object referencing the current object into the queue after all of the referenced objects have been added to the queue. For example, in FIG. 3B, the queue traversal agent 200 evaluates $Object_2$ as the current object in traversal operation step 2, adding $Object_5$ and $Object_6$ to the queue because they are referenced by $Object_2$. In this embodiment, traversal agent 200 adds a marker object referring to $Object_2$ to the queue after $Object_6$ so that when the marker object referring to $Object_2$ is removed from the queue, all of the objects referenced by $Object_2$ have been processes. Thus, when the marker object is removed from the queue post-processing operations can performed on the parent object because all of the child objects have been processed by the object evaluation agent 220.

Object processing agent 240 performs the user selected operation on a current object 250 received from traversal agent 200 using visitor agent 260. Object processing agent 240 determines whether the current object 250 needs to be processed based on the operation selected by the user. When current object 250 does need to processed, object processing agent 240 uses visitor agent 260 to operate on the data in the current object 250. For example, the user may instruct the program to create a deep copy of an object in the graph. Graph object manager 120 traverses the graph with traversal agent 200 and performs the deep copy of the object with object processing agent 240. To create a deep copy, the object processing agent 240 first confirms that the current object matches the object selected to be copied. Next, object processing agent 240 uses visitor agent 260 to access the data in the current object 250 to create a new object and copy objects for any object referenced by the current object 250. The fields in a deep copied object can be modified without changing the data in the fields of the original object because the deep copy operation creates new copy objects rather than copying only the reference in from the original object.

The traversal agent 200 populates the graph container 210 as described previously, and object processing agent 240 determines whether the current object 250 is the object that needs to be deep copied. When the current object 250 matches the object identified by the user, object processing agent 240 uses visitor agent 260 to create the deep copy.

Visitor agent 260 performs the object processing operation selected by the user. In an embodiment, visitor agent 260 performs the processing operation by accessing the data in the current object 250 using the visitor design pattern. The visitor design pattern applies operations to objects in a manner that decouples the operations from the object structure. To implement the visitor design pattern, objects in the graph include a method accepting the visitor agent 260 that allows visitor agent 260 to access the object's data. Visitor agent 260 includes code for methods that perform the processing operation on each type of object. For example, if a user initiates the graph object manager 120 to make a deep copy of an object representing a specific municipal taxing agency. Traversal agent 200 selects a current object, populates the graph container with objects referenced by the current object, and passes the current object to object processing agent 240. Object processing agent 240 determines whether the current object 250 matches the processing operation target, i.e., the specific municipal taxing agency. If the current object does not match, control returns to traversal agent 200, which selects the next object in the graph to evaluate. When the current object 250 matches the municipal taxing agency, object processing agent 240 performs the deep copy operation using visitor agent 260 to access and copy the data in the current object 250. Visitor agent 260 uses its code related to the municipal taxing agency object to perform the deep copying operation, i.e., creating a new municipal taxing agency object and new objects for each referenced object. After completing the processing operation, visitor agent 260 leaves the current object 250 and control returns to traversal agent 200.

In cases where multiple objects in the graph need to be processed, traversal agent 200 will select a new current object from the graph container 210, and the process will continue until all of the objects in the graph have been processed. In an embodiment, traversal agent 200 includes an iterator that can pause the graph traversal after an object has been processed to provide information to a user or to receive additional user feedback. That is, when visitor agent 260 complete the processing operation and returns control to traversal agent 200, traversal agent 200 pauses the traversal and waits for users input prior to selecting a new current object 250 from the graph container 210. Thus, the iterator provides external control over the traversal process that is not possible with recursive traversal methods.

FIG. 4 is a flow chart illustrating an example process for traversing an object graph, according to one embodiment. As shown, the process 400 begins at step 405, where traversal agent 200 retrieves a starting object from the graph container. At step 410, traversal agent 200 obtains the data fields of the current object using reflection. The data fields of the current object can contain references to other objects that the traversal agent 200 uses to traverse the object graph. At step 415, the traversal agent 200 determines whether any of the data fields reference another object. When the current object includes a reference to another object, the process moves to step 420, where the traversal agent 200 determines whether the referenced object is listed in the visited object registry 230. If the referenced object is not listed in the visited object registry, then at step 425 traversal agent 200 adds the referenced object to the graph container 210 and at step 430 traversal agent 200 adds the referenced object to visited object registry 230.

FIG. 5 illustrates a method for processing objects in the object graph, according to one embodiment. As shown, the process 500 begins at step 502, where object processing agent 240 receiving the current object from traversal agent 200. At step 504, object processing agent 240 determines if the object is a marker object, which indicates that all processing on the sub-objects referenced by the object is complete, as described above. If the object is a marker object, the process moves to step 506, where object processing agent 240 initiates the post-processing operations on the object. If the object is not a marker object, the process proceeds to step 510, where the visitor agent 260 determines the appropriate method for processing the current object 250 based on the type of object. For example, the visitor agent 260 uses a first method to process objects that are maps, a second method for objects that are lists, and a third method for objects that do not reference other objects. The visitor agent 260 determines the type of the current object, in this example a map, list, or other, and selects the corresponding method. At step 515, the visitor agent 260 accesses the current object 250 by calling the selected method, and at step 520, exits the current object 250 when the processing operation is complete. At step 525 control returns to traversal agent 200 because the processing operation is complete.

Figure 6:
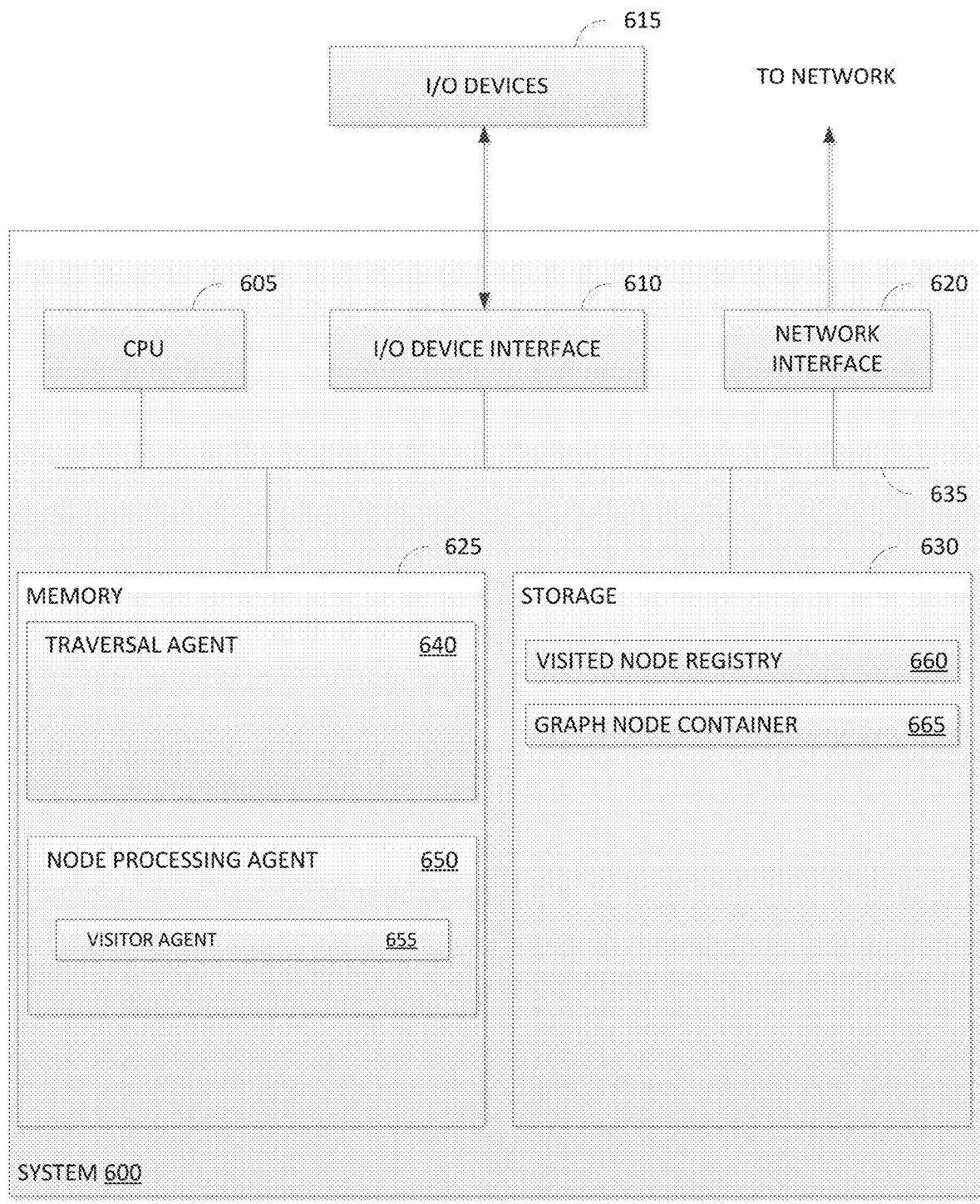
FIG. 6 is an example computing system for traversing and processing objects in an object graph, according to one embodiment.

FIG. 6 illustrates an example computing system for traversing and processing objects in an object graph. As shown, the system 600 includes, without limitation, a central processing unit (CPU) 605, one or more I/O device interfaces 610 which may allow for the connection of various I/O devices 615 (e.g. keyboards, displays, mouse devices, pen inputs, etc.) to the system 600, network interface 620, a memory 625, storage 630, and an interconnect 635.

CPU 605 may retrieve and execute programming instructions stored in the memory 625. Similarly, the CPU 605 may retrieve and store application data residing in memory 625. The interconnect 635, transmits programming instructions and application data, among the CPU 505, I/O device interface 510, network interface 620, memory 625, and storage 630. CPU 605 is included to be representative of a single CPU, multiple CPUs, a single CPU having multiple processing cores, and the like. Additionally, the memory 625 is included to be representative of a random access memory. Furthermore, the storage 630 may be a disk drive, solid state drive, or a collection of storage devices distributed across multiple storage systems. Although shown as a single unit, the storage 530 may be a combination of fixed and/or removable storage devices, such as fixed disc drives, removable memory cards or optical storage, network attached storage (NAS), or a storage area-network (SAN).

As shown, memory 625 includes traversal agent 640 with an object evaluation agent 645, and an object processing agent 650 with a visitor agent 655. Traversal agent 640 is generally configured to traverse a graph of objects by evaluating a current object and populating a container with additional objects to visit, and maintaining a list of objects already visited. Traversal agent 640 populates a graph container 665 with additional objects referenced by the current object, if any. Traversal agent 640 determines if the current object includes references to other objects by evaluating the data fields of the current object. Traversal agent 640 uses java reflection to obtain information about the fields of the current object, and evaluates each reference in the current object to determine if the reference points to another object. If so, traversal agent 640 determines if the referenced object is listed in the visited object registry 660. Visited object registry 660 includes object identifiers for objects that traversal agent 640 has previously visited, and Traversal agent 640 uses the visited object registry 660 to avoid cyclic references. When the referenced object is not listed in the visited object registry 660, Traversal agent 640 adds the referenced object to the graph container 665 maintained in storage 630. Graph container 665 contains objects that traversal agent 640 has identified but not yet visited.

Once traversal agent 640 has evaluated each object referenced by the current object, object processing agent 650 processes the current object. Object processing agent 650 performs a processing action selected by a user. Examples of processing actions include comparing objects, copying objects, or transmitting objects via a stream. If the current object is a marker object, processing agent 650 initiates post-processing operation on the object and control returns to traversal agent 640 to select a new current object from the container. If the current object is not a marker object, object processing agent 650 includes visitor agent 655 to select the appropriate processing method to perform the selected action. Visitor agent 655 selects the appropriate processing method based on the type of the current object. The processing method uses the visitor design pattern to gain access to the data within the current object. When visitor agent 655 completes the selected action, object processing agent 650 leaves the current object, and control returns to traversal agent 640. Traversal agent 640 retrieves the next object from the graph container 665 and begins the evaluation process again using the next object as the current object. The process of evaluating a current object for references to other objects continues until the graph container is empty.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for processing objects while traversing an object graph, comprising:
   receiving an instruction to perform a processing operation comprising a processing operation target;
   traversing an object graph with a traversal agent, wherein the traversing comprises:
   receiving a first object of the object graph;
   receiving a data field of the first object, the data field comprising a reference list that identifies one or more objects referenced by the first object, the reference list comprising a reference to a second object of the object graph;
   adding the second object to a working graph container comprising the first object;
   adding a marker object to the working graph container after a last one of the one or more objects referenced by the reference list have been added to the working graph;
   adding the second object to a visited object registry; and
   determining that there are no more objects of the reference listing that can be added to the visited object registry;
   determining with an object processing agent that the first object matches the processing operation target;
   transferring control of the first object from the traversal agent to a visitor agent of the object processing agent;
   performing with a visitor agent, a first processing action corresponding to the processing operation, using a data element of the first object;
   transferring control of the first object to the traversal agent when the first processing action is complete; and
   traversing, using the traversal agent, to the second object.

2. The method of claim 1, further comprising:
   evaluating the second object with the traversal agent, to identify a third object of the object graph referenced by the second object;
   determining with the object processing agent that the second object matches a second processing operation target; and
   performing with the visitor agent, a second processing action using a data element of the second object.

3. The method of claim 2, wherein the processing operation comprises the visitor agent applying a design pattern to the data element of the first object.

4. The method of claim 1, wherein the traversal agent halts further traversal of the object graph until an instruction to execute a second processing operation is received.

5. The method of claim 2, wherein while evaluating the second object with the traversal agent, controlling the first object by the visitor agent.

6. The method of claim 1, wherein the traversal agent pauses until an instruction to perform an additional processing operation is received.

7. The method of claim 5, wherein evaluation of the second object includes obtaining properties of the second object using reflection.

8. A system, comprising:
a processor; and
memory storing instructions which, when executed on the processor, operate to perform a method for processing objects while traversing an object graph, the method comprising:
  receiving an instruction to perform a processing operation comprising a processing operation target;
  traversing an object with a traversal agent, wherein the traversing comprises:
    receiving a first object of the object graph;
    receiving a data field of the first object, the data field comprising a reference list that identifies one or more objects referenced by the first object, the reference list comprising a reference to a second object of the object graph;
    adding the second object to a working queue container comprising the first object;
    adding a marker object to the working queue container after a last one of the one or more objects referenced by the reference listing have been added to the working queue;
    adding the second object to a visited object registry; and
    determining that there are no more objects of the reference listing that can be added to the visited object registry;
  determining with an object processing agent that the first object matches the processing operation target;
  transferring control of the first object from the traversal agent to a visitor agent of the object processing agent;
  performing with the visitor agent, a first processing action corresponding to the processing operation, using a data element of the first object;
  transferring control of the first object to the traversal agent when the first processing action is complete; and
  traversing, using the traversal agent, to the second object.

9. The system of claim 8, the method further comprising:
evaluating the second object with the traversal agent, to identify a third object of the object graph referenced by the second object;
determining with the object processing agent that the second object matches a second processing operation target; and
performing with the visitor agent, a second processing action using a data element of the second object.

10. The system of claim 9, wherein the processing operation comprises the visitor agent applying a design pattern to the data element of the first object.

11. The system of claim 8, wherein the traversal halts further traversal of the object graph until an instruction to perform a second processing operation is received.

12. The system of claim 8, wherein the traversal agent evaluates the second object while the visitor agent controls the first object.

13. The system of claim 8, wherein the traversal agent pauses until an instruction to perform an additional processing operation is received.

14. The system of claim 9, wherein evaluation of the first object and the second object includes obtaining properties of the first object and second object using reflection.

15. A non-transitory computer-readable medium comprising instructions which, when executed by one or more processors, performs a method for processing objects while traversing an object graph, the method comprising:
  receiving an instruction to perform a processing operation comprising a processing operation target;
  traversing an object graph with a traversal agent, wherein the traversing comprises:
    receiving a first object of the object graph;
    receiving a data field of the first object, the data field comprising a reference list that identifies one or more objects referenced by the first object, the reference list comprising a reference to a second object of the object graph;
    adding the second object to a working queue container comprising the first object;
    adding a marker object to the working queue container after a last one of the one or more objects referenced by the reference listing have been added to the working queue;
    adding the second object to a visited object registry;
    determining that there are no more objects of the reference listing that can be added to the visited object registry; and
  determining with an object processing agent that the first object matches the processing operation target;
  transferring control of the first object from the traversal agent to a visitor agent of the object processing agent;
  performing with the visitor agent, a first processing action corresponding to the processing operation, using a data element of the first object;
  transferring control of the first object to the traversal agent when the first processing action is complete; and
  traversing, using the traversal agent, to the second object.

16. The non-transitory computer-readable medium of claim 15, the method further comprising:
evaluating the second object with the traversal agent, to identify a third object of the object graph referenced by the second object;
determining with the object processing agent that the second object matches a second processing operation target; and
performing with the visitor agent, a second processing action using a data element of the second object.

17. The non-transitory computer-readable medium of claim 16, wherein the processing operation comprises the visitor agent applying a design pattern to the data element of the first object.

18. The non-transitory computer-readable medium of claim 15, wherein the traversal halts further traversal of the object graph until an instruction to perform a second processing operation is received.

19. The non-transitory computer-readable medium of claim 17, wherein the traversal agent evaluates the second object while the visitor agent controls the first object.

20. The non-transitory computer-readable medium of claim 15, wherein the traversal agent pauses until instructions to perform an additional processing operation is received.

\* \* \* \* \*